PHOSPHANILIC ACID DERIVATIVES

Burton G. Christensen, Scotch Plains, N.J., William J. Leanza, Staten Island, N.Y., and Gary H. Rasmusson, Watchung, N.J., assignors to Merck & Co., Inc., Rahway, N.J., a corporation of New Jersey
No Drawing. Filed Jan. 31, 1967, Ser. No. 614,529
Int. Cl. C07f 9/02; C07c 85/02
U.S. Cl. 260—502.5      6 Claims

ABSTRACT OF THE DISCLOSURE

A substituted nitrobenzene phosphonic acid is reduced to the corresponding phosphanilic acid. The nitrobenzene phosphonic acid may be prepared from the corresponding nitraniline which is converted to the nitrobenzene diazonium fluoborate, this diazonium salt is treated with a phosphorus trihalide in the presence of cuprous ion to yield, on hydrolysis, the desired nuclearly substituted nitrobenzene phosphonic acid.

Variations of this method are disclosed where the nuclear substituents are 3-halo. These novel nuclearly substituted phosphanilic acids are useful as anti-bacterial agents and coccidiostats.

CROSS REFERENCES TO RELATED APPLICATIONS

This application is related to Christensen and Leanza, U.S. Ser. No. 612,800 filed Jan. 31, 1967.

BACKGROUND OF THE INVENTION

Field of the invention

The invention pertains to the preparation of novel nuclearly substituted phosphanilic acids which are useful as anti-bacterial agents.

Description of the prior art

Phosphanilic acid has been synthesized (inter alia Doak et al. JACS 74 753 (1952)) and found to be active against *L. plantarium* (Kuhn et al. Ber. 75, 711 (1942)), *E. coli* (Klotz et al. JACS 69, 473 (1947)), *C. diphtheriae, Sh. dysenteriae, Ps. fluorescens, S. typhosa, K. pneumoniae, Br. bronchiseptica* and *D. pneumoniae* (Thayer et al., Antibiotics and Chemotherapy, 3, 256 (1953)). However, several substituted benzene phosphonic acids, including phosphanilic acid and nuclearly substituted phosphanilic acids (including 2-chloro phosphanilic acid) have been prepared and tested, in vitro, against *T. pallidum* (the syphilis organism) but found inactive although certain nitro- and substituted nitrobenzene phosphonic acids do show in vitro activity against this organism (Doak et al. Antibiotics and Chemotherapy 8, 346 (1958)).

A general method for the synthesis of substituted benzene phosphonic acids is disclosed by Doak et al. (JACS 73 5658 (1951)).

Bacteriological test data

Compounds of the present invention have been tested against a variety of microorganisms and their activity compared to that of other bacterials, notably sulfisoxazole and phosphanilic acid as well as chlorophosphanilic acid which heretofore has not been known to have any antibacterial activity.

Table I shows the relative activities, against *S. schottmuelleri* of phosphanilic acid, 2-chlorophosphanilic acid and certain compounds produced in accordance with the present invention. In this test, mice were infected with the *S. schottmuelleri* organism and the test compound administered orally in two separate doses, one at the time of infection and the other six hours later. The results are summarized as follows:

+++ active at 0.2–0.5 mg./dose×2.—About equal to phosphanilic acid in activity

++++ active at <0.2 mg./dose×2.—More active than phosphanilic acid

| Nuclear variants of phosphanilic acid: | Activity |
|---|---|
| H | +++ |
| 2-Cl | ++++ |
| 2-F | ++++ |
| 2-Br | ++++ |
| 2,6-diF | ++++ |

Table II shows the results of tests carried out under similar conditions involving the organisms *P. vulgaris* and *P. aeruginosa* as well as *S. schottmuelleri*:

TABLE II.—COMPARATIVE ORAL EFFICACY IN EXPERIMENTAL INFECTIONS

| | $ED_{50}$—mg./dose—2 doses | | | |
|---|---|---|---|---|
| Compound | S. schott-muelleri [1] | P. vul-garis 1810 [1] | P. aeru-ginosa 2616 [1] | P. aeru-ginosa 3210 [1] |
| Sulfisoxazole | 1.37 | 0.134 | >10.0 | 1.86 |
| Phosphanilic acid | 0.341 | 0.450 | 4.0 | 0.312 |
| 2-chlorophosphanilic acid [2] | 0.071 | 4.27 | | ca. 5.0 |
| 2-fluorophosphanilic acid [2] | 0.162 | 0.304 | 0.60 | 0.607 |

[1] Geometric mean from 2 tests each.
[2] Results obtained in several tests indicate no statistical difference in the activity of the chloro and fluoro compounds against *S. schottmuelleri*.

It is significant to observe that while 2-chloro and 2-fluorophosphanilic acid are both superior to phosphanilic acid against *S. schottmuelleri* infections, the 2-fluorophosphanilic acid is far more active than 2-chlorophosphanilic acid with respect to *P. vulgaris* and *Ps. aeruginosa* infections. Table III shows a comparison of the in vivo activity of 2-fluorophosphanilic acid with that of sulfisoxazole against a variety of microorganisms resistant to a number of antibiotics in which the activity of the 2-fluorophosphanilic acid is shown to be superior to that of sulfisoxazole with regard to certain of the organisms.

TABLE III.—SUMMARY OF EFFICACY DATA

| | | | Oral $ED_{50}$—mg./mouse×2 [1] (Number of tests in parentheses) | |
|---|---|---|---|---|
| Organism | Source | In vitro resistance [3] | 2-fluoro Phosphanilic Acid | Sulfisox-azole |
| *E. coli* S2208 | Chick | G, S, T, D | [2] >10.0 (2) | >20.0 (2) |
| Pseudomonas S-7 | Human | G, S, N*, C*, D, T | 2.32 (2) | >20.0 (2) |
| *Ps. aeruginosa* II | ? | G, S, D*, N*, C* | >10.0 (2) | >20.0 (2) |
| Proteus S-9 | Human | G, S, T, D, N*, C*, P, CO | >10.0 (1) | >20.0 (1) |
| Aerob.-Kleb. S-5 | do | G, S, T, D, C | [2] 8.5->10.0 (3) | >20.0 (3) |

[1] Geometric mean, where applicable. Mice dosed 0 and 6 hours after infecting.
[2] Significant prolongation of mean survival time.
[3] G=sulfisoxazole; S=sulfadiazine; D=streptomycin; N=neomycin; C=chloramphenicol; T=tetracyclines; P=polymyxin; CO=colistan sulfate; *=moderately resistant, nalidixic acid not included in in vitro tests to date.

2-fluorophosphanilic acid is active against *E. brunetti* at a level of 0.02% in feedstuffs.

SUMMARY OF THE INVENTION

Compounds and processes of preparing compounds having the structural formula:

$$\underset{NH_2}{\underset{\displaystyle |}{\overset{PO(OH)_2}{\underset{\displaystyle |}{\bigodot}}}} \begin{array}{c} R_1 \\ R_2 \end{array} \quad R_3$$

wherein:

$R_1$ is hydrogen, fluoro or bromo,
$R_2$ is hydrogen or fluoro, and
$R_3$ is hydrogen or $R_1$ where $R_1$ is fluoro, provided that not more than two of the substituents $R_1$, $R_2$ and $R_3$ are hydrogen.

These compounds have been found to be active against a variety of bacteria, in particular *Ps. aeruginosa* and *Salmonella schottmuelleri*. Activity against certain sulfa resistant organisms is also shown.

DESCRIPTION OF THE PREFERRED EMBODIMENTS

The substituted phosphanilic acids of the present invention are generally prepared by reducing the corresponding nitrobenzene phosphonic acid either by chemical means, for example by means of a reducing agent, such as ammonium sulfide or catalytically, for example, by reduction with hydrogen in the presence of a noble metal catalyst, such as palladium on barium sulfate or platinum oxide or alternatively by hydrogen in the presence of Raney nickel. Nitrobenzene phosphonic acid may be prepared from the corresponding nitraniline which is treated with a nitrite in the presence of fluoboric acid to yield a diazonium fluoborate. On treatment of the diazonium salt with a phosphorylating agent, suitably, a phosphorus trihalide in the presence of cuprous iron, there is obtained the desired nitrobenzene phosphonic acid.

While this embodiment is preferred for most of the compounds of the present invention, where the nuclear substituent is a 3-halo compound, the starting material is a 2-halo nitraniline wherein the amino group is protected, the nitro group is converted into a phosphonic acid group.

In the principal embodiment of the invention, a substituted nitraniline, for example, a 2-halo nitraniline, such as 2-fluoro or 2-bromo nitraniline, or 2,6-dihalo nitranilines, such as 2,6-difluoro or 2,6-dichloro nitraniline are converted to the corresponding diazonium fluoborates by treatment with fluoboric acid and sodium nitrite.

In the preferred procedure, the nitraniline is suspended in an excess of concentrated aqueous fluoboric acid, suitably 48% fluoboric acid, the mixture cooled to from −5° C. to +10° C., preferably between 0° C. and −5° C. and sodium nitrite added thereto. While sodium nitrite may be added in solid form, it is preferred to use a concentrated aqueous solution, suitably one containing from 30 to 70 parts by weight of nitrite. The reaction mixture is stirred and the diazonium salt isolated as a crystalline precipitate. In the preferred mode of isolation, the precipitate is separated from the reaction mixture by filtration, suitably on a non-reactive filter base, such as a fritted glass disk and washed sequentially with fluoboric acid, an alkanol, suitably ethanol and then an ether, suitably diethyl ether. The diazonium salt obtained by this means is of a sufficient grade of purity to be utilized in the next stage of the reaction.

The nitrobenzene diazonium salt is then converted to the corresponding phosphonic acid by treatment with a phosphorus halide in the presence of a cuprous salt. In the preferred procedure, the diazonium salt is suspended in an anhydrous organic medium which is substantially inert to hydrohalic acids, such as an alkyl ester, for example, ethyl acetate or a high boiling ether such as dioxane to which is added a small excess, suitably a 25–50% excess, of a phosphorus halide, such as phosphorus trichloride or phosphorus tribromide followed by a catalytic amount of cuprous salt, suitably between 1 and 5% by weight of the salt, such as anhydrous cuprous chloride. In most cases, the reaction takes place spontaneously with vigorous evolution of nitrogen gas. It may sometimes be necessary to initiate the reaction by very gentle heating after which the heat source is removed. After the spontaneous evolution of gas has ceased, it is desirable to heat the mixture further until the evolution of gas ceases entirely. The reaction is then quenched by the addition of water and the volatile organic components are removed, preferably by steam distillation. The nitrobenzene phosphonic acid thus produced is then isolated.

In the preferred procedure, the crude product may be separated from the residue of the steam distillation by filtration and purified by solution in a base, suitably, an aqueous alkali such as sodium or potassium hydroxide, the solution brought to a pH between 7 and 10, preferably pH 7.5 to 9 by the careful addition of acid. Although aqueous mineral acids may be used, it is preferred to employ an organic acid, suitably glacial acetic acid. This slightly alkaline solution is then filtered, preferably through a diatomaceous earth, and the pure form of the phosphonic acid as its hemi alkali metal salt, suitably the hemi sodium salt, precipitated from the filtrate by further addition of an acid to a pH between 3 and 7, suitably from pH 5 to 6.

The nitrobenzene phosphonic acid hemi metal salt is then reduced to the corresponding phosphanilic acid. This may be done either by catalytic reduction or by chemical reduction.

In the first mode of reduction, the nitrobenzene phosphonic acid in the form of the hemi metal salt is hydrogenated in the presence of a noble metal catalyst, suitably palladium on barium sulfate or platinum oxide under initially slightly acid conditions (pH 4 to 6.5) at an initial pressure of between 20 and 60 p.s.i. Alternatively, Raney nickel may be used as a catalyst; in this latter embodiment, the hydrogenation is carried out under basic conditions, that is to say, in the presence of an excess of aqueous base, suitably aqueous alkali, such as sodium hydroxide but at similar pressures. The phosphanilic acid is then isolated. If necessary, the hydrogenation mixture is made basic adjusted to a pH of between 7 and 10, the catalyst removed by filtration and the filtrate acidified to a pH of 3 to 4.5 by the addition of an acid, an organic acid, such as acetic acid, or a mineral acid, such as aqueous hydrochloric acid being suitable and the desired phosphanilic acid separated as the residue by filtration. Where a mineral acid is used for the acidification step, it is important that the pH does not fall below pH 3 or else the product will redissolve due to the formation of the acid addition salt. Hence, it is preferred to acidify with an organic acid, such as acetic acid since with these acids no precautions are needed to avoid the formation of the acid addition salt.

In the chemical mode of reduction, the nitrobenzene phosphonic acid is reduced with ammonium sulfide. In this procedure, the nitrobenzene phosphonic acid or its hemi metal salt is taken up in concentrated aqueous ammonia, suitably 6 N aqueous ammonia and cooled to from about 0° C. to about 10° C., preferably to about 5° C., and gaseous hydrogen sulfide is passed into the mixture until the solution is saturated. In order to obtain optimum results from this reduction, it is preferred that the temperature of the reaction mixture be held below 50° C. When the solution has become saturated with hydrogen sulfide, the mixture is boiled gently until no further evolution of gas, that is to say, no hydrogen sulfide or ammonia is noted. The product is then isolated. In this mode of reduction, the chief contaminants are solid and colloidal sulfur.

In the preferred mode of isolation, the reaction mixture is filtered hot to remove the solid sulfur. The filtrate is then acidified with either a dilute mineral acid or an organic acid, preferably the latter, suitably glacial acetic acid, and a base, suitably an aqueous alkali such as dilute aqueous sodium hydroxide added until the pH of the mixture is greater than 7, for example between 7 and 8.5. The mixture is then heated to a temperature of between 80° C. and 100° C. This procedure serves to convert the colloidal sulfur to solid sulfur. The solution is then filtered hot and treated with a small excess of an acid again, preferably glacial acetic acid to bring the pH below 7, for example to from 4 to 6, to yield the phosphanilic acid as a crystalline precipitate on cooling. Here again it should be noted that where a mineral acid is used in the acidification step, care should be taken that the pH does not fall below 3 to avoid the formation of the acid addition salt.

In a further embodiment of the invention, in order to produce 3-halo phosphanilic acids, a 2-halo-4-nitraniline, for example, 2-fluoro-, 2-chloro-, or 2-bromo-4-nitraniline is reacted with phthalic anhydride to form the corresponding phthalimide, suitably, this reaction is carried out by heating a mixture of the constituents for a period of from about 20 to about 60 minutes at a temperature of from about 150° C. to 190° C. The phthalimide is then isolated. The isolation may be carried out by extraction with a water immiscible organic solvent, such as chloroform, which on evaporation yields the desired compound which may then be recrystallized suitably from glacial acetic acid. The phthalimide is then reduced.

In the preferred procedure, the reduction is carried out in an acid medium, preferably in a lower alkanoic acid, such as glacial acetic acid by hydrogenation in the presence of a catalyst, for example, a noble metal catalyst, such as palladium or a suitable carrier, for example barium sulfate or any other noble metal catalyst. The product is then isolated, suitably, the hydrogenation mixture is filtered, the residue extracted with hot glacial acetic acid and the combined acid filtrates evaporated to yield a residue which on recrystallization gives the desired N-(2-fluoro - 4 - aminobenzene) phthalimide. The N-(2-halo-4-aminobenzene) phthalimide is then diazotized and the diazonium salt converted into the corresponding phosphonic acid according to the procedure set forth hereinabove.

The isolation procedure, however, is somewhat different. The residual solution (in the boiler) after the steam distillation, contains a mixture of the desired phosphanilic acid and phthalic acid. The preferred isolation procedure depends upon the fact that phosphanilic acid contains a basic moiety. In this procedure, the residue in the boiler is concentrated to dryness and taken up in dilute aqueous base, 20% sodium hydroxide or any other alkali being preferred. A carbonate such as sodium or potassium carbonate may be used but is not recommended. The basic solution is decolorized suitably by treatment with animal charcoal and filtered. The filtrate is made slightly acid by the addition of concentrated mineral acid, concentrated hydrochloric acid being especially suitable. It is important that the pH not be reduced below the range of pH 4 through 5. A precipitate forms immediately. This precipitate comprises substantially of phthalic acid and product. It is removed by filtration and treated with dilute aqueous mineral acid, cooled to from about 0° C. to about 5° C. and filtered. The residual solid is washed with small portions of cold dilute mineral acid, again dilute aqueous hydrochloric acid being preferred and all of the mineral acid filtrates combined and concentrated to dryness to yield the desired phosphanilic acid as a residue. The phosphanilic acid is further purified by treating the residue with dilute aqueous alkali, suitably 10% aqueous sodium hydroxide to pH 7.5 to 8.5. The solution is filtered and acidified with an organic acid, an alkanoic acid such as glacial acetic acid being especially suitable. On cooling, the pure 3-halo phosphanilic acid separates out slowly and is isolated by filtration.

The following examples are given for the purpose of illustration and not by way of limitation.

EXAMPLE 1

2-fluoro-4-aminobenzene phosphonic acid

A suspension of 60 g. (0.385 mole) of 2-fluoro-4-nitraniline (M.P. 133.5–134.5° C.) in 170 ml. of 48% fluoroboric acid is treated slowly with 26.0 g. (0.38 mole) of solid sodium nitrite at ice bath temperature with vigorous stirring. After complete addition the mixture is stirred five minutes and then filtered on a fritted glass funnel. The insoluble diazonium salt is washed successively with 30 ml. of cold 48% fluoroboric acid, twice with 60 ml. of ethanol and then with ether until the washings come through colorless to yield 2-fluoro-4-nitrobenzene diazonium fluoborate.

A suspension of 46.0 g. (0.18 mole) of 2-fluoro-4-nitrobenzene diazonium fluoborate in 250 ml. of anhydrous ethyl acetate is treated successively with 16 ml. (25.2 g., 0.183 mole) of phosphorus trichloride and 1.0 g. of cuprous bromide with stirring. On slow warming to 40° C. an exothermic reaction occurred with gas evolution. When the reaction subsides the mixture is heated at 60° C. for 10 minutes and then cooled on ice. Water (50 ml.) is carefully added. The mixture is then steam distilled to remove the volatile by-products. The aqueous residue is filtered and the filtrate concentrated under reduced pressure to a thick mass (ca. 30 ml.). This material is filtered with suction through fritted glass. The separated solid (ca. 15 g.) is treated with 10% sodium hydroxide solution until the mixture is at pH 8. This mixture is filtered over diatomaceous earth to remove the insoluble copper salts. The pH of the filtrate is then adjusted to pH 5 and the resulting solution of crude 2-fluoro-4-nitrobenzenephosphonic acid hydrogenated in the presence of platinum (from 1.0 g. of platinum oxide). After uptake of 0.08 mole of hydrogen the catalyst is removed and the product is precipitated by addition of glacial acetic acid. The acid separates slowly as a finely divided powder. It is filtered, washed with a small amount of water and air dried to yield 2-fluoro-4-aminobenzenephosphonic acid, M.P. (dec.) 250° C.

EXAMPLE 2

2-bromo-4-aminobenzenephosphonic acid 4.27 gms. (0.0015 mole) of 2-bromo-4-nitrobenzenephosphonic acid is treated with 70 ml. of 6 N aqueous ammonia and cooled to 5° C. Gaseous hydrogen sulfide is passed into the mixture until saturated, the temperature being held below 50° C. The mixture is then boiled gently until all excess hydrogen sulfide and ammonia has been removed. The mixture is then filtered hot and the filtrate treated with 5 ml. of glacial acetic acid. A white solid separates which is treated with 1 N aqueous sodium hydroxide until the pH of the mixture is about 7. The mixture is heated on a steam bath, filtered hot and treated with 5 ml. glacial acetic acid to yield 2-bromo-4-aminobenzenephosphonic acid, M.P. 283–285° C.

EXAMPLE 3

2,6-difluoro-4-nitraniline 60 g. of 2,6-difluoro-4-nitroanisole is heated in a bomb tube with 600 ml. of liquid ammonia for 6 hours at 100° C. The tube is cooled and the ammonia evaporated. The residue is heated with 400 ml. of ether and filtered, the filtrate washed with water, and the solvent removed under reduced pressure. The residue is taken up in 300 ml. of benzene and chromatographed on 1,500 g. of alumina. Elution with benzene followed by ether yields first a by-product followed by 2,6-difluoro-4-nitraniline, M.P. 160–161° C.

EXAMPLE 4

2,6-difluoro-4-nitrobenzenephosphonic acid 7.9 g. of 2,6-difluoro-4-nitraniline is suspended in 30 ml. of 48% fluoboric acid, cooled to −5° C. to 0° C. and a solution of 3.1 g. of sodium nitrite in 4 ml. of water is slowly added at the same temperature. The temperature is held in this range for 30 minutes. The mixture is cooled to −5° C., filtered, washed with cold fluoroboric acid and dried under a stream of nitrogen followed by a rinse of cold ether again followed by drying under a stream of nitrogen to yield 11.3 g. of 2,6-difluoro-4-nitrobenzene diazonium fluoborate. This salt is suspended in 60 ml. of ethyl acetate and 4 ml. of phosphorus trichloride and 10 mg. of cuprous chloride is added. A slight exotherm is noted and the reaction mixture kept below 60° C. After 30 minutes, the mixture is filtered and ice is added to the filtrate to hydrolyze any remaining phosphorus trichloride and the ethyl acetate removed by evaporation under reduced pressure. The residual aqueous solution is extracted with petroleum ether and the aqueous solution boiled with charcoal and filtered. The filtrate is concentrated to yield 2,6-difluoro-4-nitrobenzenephosphonic acid which separates in crystalline form and is isolated by filtration. The product is washed with concentrated hydrochloric acid and air dried. Recrystallization from ether yields a product having M.P. 112–113° C.

EXAMPLE 5

2,6-difluoro-4-aminobenzenephosphonic acid 0.5 g. of 2,6-difluoro-4-nitrobenzenephosphonic acid is dissolved in 20 ml. of water and hydrogenated under a pressure of 40 p.s.i. at 25° C. in the presence of 50 mg. of platinum oxide. The desired product is precipitated out of solution during the hydrogenation. The hydrogenation mixture is filtered and the product taken up in dilute sodium hydroxide and the solution filtered again. The alkaline filtrate is acidified to yield 2,6-difluoro-4-aminobenzenephosphonic acid M.P. (dec.) 270° C.

EXAMPLE 6

N-(2-fluoro-4-nitrobenzene)-phthalimide 20 g. of 2-fluoro-4-nitraniline and 20 gm. of phthalic anhydride are mixed in a mortar and heated for 30 minutes at 170–180° C. The mixture is then treated with 2 l. of chloroform and the solution washed with 800 ml. of 5% sodium bicarbonate solution and water. The chloroform layer is dried over sodium sulfate, and evaporated to yield a yellow solid which is recrystallized from glacial acetic acid to yield N-(2-fluoro-4-nitrobenzene)-phthalimide, M.P. 229–231° C.

EXAMPLE 7

N-(2-fluoro-4-aminobenzene)-phthalimide 26.5 g. of N-(2-fluoro-4-nitrobenzene)-phthalimide is dissolved in 500 ml. of glacial acetic acid and hydrogenated in the presence of 3 gms. of 10% palladium on barium sulfate catalyst at a pressure of 41 lb. per sq. in. The reaction is complete in less than one hour. The mixture is filtered and the residue treated with 500 ml. of glacial acetic acid under reflux. The hot solution is filtered, combined with the previous filtrate, and the combined acetic acid solutions concentrated to give a brown residue. This residue is taken up in ethyl acetate, heated under reflux with animal charcoal, filtered, the filtrate concentrated to dryness and the residue recrystallized from hot glacial acetic acid to yield N-(2-fluoro-4-aminobenzene)-phthalimide, M.P. 230–238° C.

EXAMPLE 8

3-fluoro-4-phthalimidobenzene diazonium fluoborate 16.8 gm. (0.66 moles) of N-(2-fluoro-4-aminobenzene)-phthalimide is suspended in 45 ml. of fluoboric acid (48%) and treated with a solution of 4.46 gm. of sodium nitrite in 9 ml. of water at a temperature of 5° C. After one-half of the sodium nitrite solution has been added, an additional 25 ml. of fluoboric acid is added. The addition of the aqueous sodium nitrite is then completed, the mixture stirred for 10 minutes and slowly filtered. The residue is washed with cold fluoboric acid and then with ether to yield 3-fluoro-4-phthalimidobenzene diazonium fluoborate.

EXAMPLE 9

3-fluorophosphanilic acid 22.5 gm. (0.06 moles) of 3-fluoro-4-phthalimidobenzene diazonium fluoborate, 0.4 gms. of cuprous chloride and 6.5 ml. of phosphorus trichloride in 75 ml. of ethyl acetate are stirred with heating to just below the boiling point of the mixture until evolution of gas subsides. The mixture is then heated under reflux for 45 minutes, allowed to cool to 15° C., and treated dropwise with 25 ml. of water to give a white precipitate. The solvent is removed by steam distillation and the residual mixture concentrated to dryness. The residual solid is treated with 20% sodium hydroxide solution until it is at pH 8–9. The resulting solution is treated with animal charcoal and filtered. The filtrate is adjusted with concentrated hydrochloric acid to pH 4 to give a solid precipitate which is separated by filtration and treated with 80 ml. of 20% hydrochloric acid and stirred for 30 minutes, cooled on ice and filtered. The residual solid is washed with small portions of cold 20% hydrochloric acid and discarded. The combined filtrates were concentrated to dryness and this residual solid was treated with 10% sodium hydroxide until the pH was about 8. Filtration followed by acidification of the filtrate with acetic acid afforded the 3-fluorophosphanilic acid as a slowly separating solid. It was separated by filtration and washed with acetone, M.P. (dec.) 218° C.

We claim:

1. A compound having the formula:

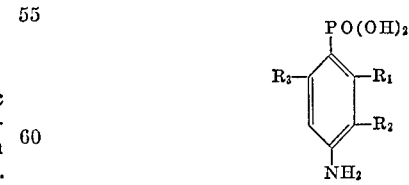

wherein:

$R_1$ is hydrogen, fluoro or bromo,
$R_2$ is hydrogen or fluoro, and
$R_3$ is hydrogen or $R_1$ where $R_1$ is fluoro, provided that not more than two of the substituents, $R_1$, $R_2$ and $R_3$ are hydrogen.

2. A compound according to claim 1 wherein $R_1$ is fluoro or bromo and $R_2$ and $R_3$ are hydrogen.

3. A compound according to claim 1 wherein $R_2$ is fluoro and $R_1$ and $R_3$ are hydrogen.

4. A compound according to claim 1 having the designation 2,6-difluoro-4-aminobenzenephosphonic acid.

5. A compound according to claim 1 having the designation 2-fluoro-4-aminobenzenephosphonic acid.

6. A compound according to claim 1 having the designation 2-bromo-4-aminobenzenephosphonic acid.

References Cited

UNITED STATES PATENTS

| 2,374,807 | 5/1945 | Dickey et al. | 260—502.5 |
| 2,653,160 | 9/1953 | Doak et al. | 260—502.5 |
| 2,765,279 | 10/1956 | Nusslein | 260—502.5 |
| 2,776,985 | 1/1957 | McKinnis | 260—502.5 |

FOREIGN PATENTS 165,168   10/1964   U.S.S.R.

OTHER REFERENCES

Limaye et al., "Chem. Abstracts," vol. 45 (1951), p. 7543.

Doak et al., "Chem. Abstracts," vol. 48 (1954), p. 1984.

Freedman et al., "Chem. Abstracts," vol. 48 (1954) pp. 3917–3918.

Doak et al., "J. Am. Chem. Soc.," vol. 73 (1951), pp. 5658–5660.

Doak et al., "Antibiotics And Chemotherapy," vol. 8, (1958), pp. 342–348.

LEON ZITVER, *Primary Examiner.*

J. E. EVANS, *Assistant Examiner.*

U.S. Cl. X.R.

260—141, 326, 581, 582, 999